United States Patent
Xu et al.

(10) Patent No.: US 11,951,614 B1
(45) Date of Patent: Apr. 9, 2024

(54) DUAL-JOINT MULTI-DEGREE-OF-FREEDOM MECHANICAL ARM AND DRIVING METHOD THEREOF

(71) Applicant: HANGZHOU DIANZI UNIVERSITY, Hangzhou (CN)

(72) Inventors: Ming Xu, Hangzhou (CN); Hui Liu, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 18/506,914

(22) Filed: Nov. 10, 2023

Related U.S. Application Data

(63) Continuation of application No. PCT/CN2023/108783, filed on Jul. 24, 2023.

(30) Foreign Application Priority Data

Dec. 15, 2022 (CN) .......................... 202211613883.4

(51) Int. Cl.
B25J 17/02 (2006.01)
(52) U.S. Cl.
CPC ................. B25J 17/0266 (2013.01)
(58) Field of Classification Search
CPC ...... B25J 9/0051; B25J 9/0015; B25J 9/0018; B25J 18/02; B25J 18/06; B25J 17/0275; B25J 17/0266
See application file for complete search history.

(56) References Cited

U.S. PATENT DOCUMENTS 9,849,586 B2 * 12/2017 Rosheim ................ A61B 34/37

FOREIGN PATENT DOCUMENTS

| | | |
|---|---|---|
| CN | 108214474 A | 6/2018 |
| CN | 108724163 A | 11/2018 |
| CN | 112109112 A | 12/2020 |
| CN | 112643651 A | 4/2021 |
| CN | 212919457 U | 4/2021 |
| JP | 2011121163 A | 6/2011 |
| JP | 2020146810 A | 9/2020 |

OTHER PUBLICATIONS

Internation Search Report of PCT/CN2023/108783, dated Oct. 11, 2023.

* cited by examiner

*Primary Examiner* — Gregory Robert Weber

(57) ABSTRACT

A dual-joint multi-degree-of-freedom mechanical arm and a driving method thereof. The mechanical arm comprises a base, a driving mechanism, a large arm module and a small arm module. The driving mechanism comprises three bidirectional driving components mounted on the base; and the big arm module comprises a big arm push rod, a big arm central rod and an elbow joint universal plate. The comprises a wrist joint universal plate, a universal joint coupler, a small arm central rod, a small arm stretching rod and a wrist joint universal plate. The small arm stretching rod comprises a first connecting rod and a second connecting rod in transmission connection. Two-degree-of-freedom rotation of the big arm module and the small arm module connected in series is independently realized by using three bidirectional driving components fixed on the base, so that movement flexibility of an end executor in a working space is greatly improved.

10 Claims, 6 Drawing Sheets

DUAL-JOINT MULTI-DEGREE-OF-FREEDOM MECHANICAL ARM AND DRIVING METHOD THEREOF

CROSS-REFERENCE TO RELATED APPLICATIONS

This application is a continuation of International Patent Application No. PCT/CN2023/108783 with a filing date of Jul. 24, 2023, designating the United States, now pending, and further claims priority to Chinese Patent Application No. 202211613883.4 with a filing date of Dec. 15, 2022. The content of the aforementioned applications, including any intervening amendments thereto, are incorporated herein by reference.

TECHNICAL FIELD

The present invention belongs to the field of steering engine transmission and mechanical arm driving and design, and particularly relates to a novel steering engine driving mode and a novel mechanical arm elbow-wrist joint structure design.

BACKGROUND OF THE PRESENT INVENTION

An steering engine or a motor is arranged at a joint of a traditional mechanical arm, which makes a spatial structure at the joint larger and bulky, moreover, each joint has only one rotational freedom, which leads to realization of a multi-degree-of-freedom swing by connecting multiple joints in series, thus making the whole mechanical arm inflexible, larger in size and weight, and not suitable for operation in a small space. Furthermore, setting the steering engine or the motor at each joint will increase a weight of the moving part of the mechanical arm, which is not conducive to precise control of the mechanical arm; at the same time, setting the steering engine or the motor at each joint will also bring about problems such as difficult wiring of a control line. Therefore, a mechanical arm with a compact structure, with all power elements integrated on the base, and with each joint having multiple rotational degrees of freedom, is required to design.

SUMMARY OF THE PRESENT INVENTION

The present invention aims at providing a dual-joint multi-degree-of-freedom mechanical arm and a driving method thereof.

In the present invention, the dual-joint multi-degree-of-freedom mechanical arm comprises a base, a driving mechanism, a big arm module and a small arm module. The driving mechanism comprises three bidirectional driving components mounted on the base. The bidirectional driving component not only outputs a rotary motion but also outputs an axial stretching motion. The big arm module comprises a big arm push rod, a big arm central rod and an elbow joint universal plate. The elbow joint universal plate is provided with a first central ball socket and three waist-shaped ball sockets surrounding the first central ball socket.

An inner end of the big arm central rod is fixed with the base. A first central sphere is fixed at an outer end of the big arm central rod. The first central sphere and the first central ball socket on the elbow joint universal plate form a spherical pair. Inner ends of the three big arm push rods are fixed with output shafts of the three bidirectional driving components; and connecting balls (3-2) are fixed at outer ends of the three big arm push rods. The three connecting balls are respectively constrained in the three waist-shaped ball sockets The small arm module comprises a universal joint coupler, a small arm central rod, a small arm stretching rod and a wrist joint universal plate. The wrist joint universal plate is provided with a second central ball socket. An inner end of the small arm central rod is fixed with the elbow joint universal plate. An outer end of the small arm central rod is fixed with a second central ball. The second central ball and a second central ball socket on the wrist joint universal plate form a spherical pair.

The small arm stretching rod comprises a first connecting rod and a second connecting rod. An outer end of the first connecting rod and an inner end of the second connecting rod form a spiral pair. An inner end of the first connecting rod in the three small arm stretching rods is in transmission connection with three connecting balls through the universal joint coupler respectively. An outer end of the second connecting rod in the three small arm stretching rods and three different positions on the wrist joint universal plate respectively form rotating pairs.

As preferred, the three bidirectional driving components are arranged in a regular triangle.

As preferred, the first central ball socket is located at a central position of the elbow joint universal plate. The three waist-shaped ball sockets are evenly distributed along a circumferential direction of the first central ball socket.

As preferred, a plane at which the three waist-shaped ball sockets are located together is a characteristic plane; and a characteristic plane normal passing through a center of the first central ball socket is a characteristic central line. A longitudinal direction of the waist-shaped ball socket is arranged along a radial direction of the characteristic central line.

As preferred, a cross section of the waist-shaped ball socket is in a shape of a waist-shaped hole; and a profile of a longitudinal section of the waist-shaped ball socket is two mutually opposite circular arcs.

As preferred, a big arm flexible housing is fixed at an outer side of the elbow joint universal plate. An edge of the big arm flexible housing is connected with an edge of the base through a cylindrical big arm protective sleeve. A small arm flexible housing is fixed at an outer side of the wrist joint universal plate. An edge of the small arm flexible housing is connected with the edge of the big arm flexible housing through a cylindrical small arm protective sleeve.

As preferred, the wrist joint universal plate is provided with three articulated shafts. The second central ball socket is located at a central position of the wrist joint universal plate. The three articulated shafts are evenly distributed along a circumferential direction of the second central ball socket. Axial lines of the articulated shafts are all arranged along a tangential direction of the second central ball socket. An outer end of the second connecting rod is fixed with an articulated sleeve. The articulated sleeves on the three second connecting rods are respectively articulated with the three articulated shafts on the wrist joint universal plate.

As preferred, the bidirectional driving component comprises a housing, a stretching driving steering engine, a rotary driving steering engine, an output shaft, a dual-purpose cylindrical gear, a circumferential transmission gear, a circumferential driving gear, an axial transmission gear and an axial driving gear. The output shaft and the housing form a cylindrical pair. The circumferential transmission gear is rotatably connected in the housing. An axial line of the circumferential transmission gear is parallel to an axial line of the output shaft. The axial transmission gear is rotatably connected in the housing. An axial line of the axial transmission gear is perpendicular to an axial line of the output shaft Both the stretching driving steering engine and the rotary driving steering engine are fixed in the housing; the axial driving gear is fixed on the output shaft of the stretching driving steering engine; and the circumferential driving gear is fixed on the output shaft of the rotary driving steering engine. The circumferential driving gear is meshed with the circumferential transmission gear. The axial driving gear is meshed with the axial transmission gear.

The dual-purpose cylindrical gear is coaxially fixed on the output shaft. An outer circumferential surface of the dual-purpose cylindrical gear is provided with a plurality of gear tooth arrays evenly distributed along a circumferential direction of an axial line of the cylindrical gear. Each gear tooth array comprises a plurality of dual-purpose gear teeth sequentially arranged at equal intervals along an axial direction of the dual-purpose cylindrical gear. Two side surfaces of each dual-purpose gear tooth in a tangential direction of the dual-purpose cylindrical gear are circumferential meshing tooth surfaces being able to be matched with the circumferential transmission gear for transmission. Two side surfaces of each dual-purpose gear tooth along the axial direction of the dual-purpose cylindrical gear are axial meshing tooth surfaces being able to be matched with the axial transmission gear for transmission. In a working process, the circumferential transmission gear rotates to drive the dual-purpose cylindrical gear to rotate; and the axial transmission gear rotates to drive the dual-purpose cylindrical gear to move in an axial direction.

As preferred, a value range of a tooth width $B_1$ of the circumferential transmission gear is $m_1'*4 \leq B_1 \leq m_1'*6$; a value range of a tooth width $B_2$ of the axial transmission gear is $m_1*3 \leq B_2 \leq m_1*5$; and $m_1'$ and $m_1$ are an axial module and a circumferential module of the dual-purpose cylindrical gear.

A driving method of the dual-joint multi-degree-of-freedom mechanical arm comprises the following steps of:
  step 1: according to a work task of the mechanical arm, mounting a corresponding end executor on an outer side surface of the wrist joint universal plate; and
  step 2: driving the elbow joint universal plate to overturn through an axial motion of the output shafts of the three bidirectional driving components; and driving the wrist joint universal plate to overturn through a circumferential rotation of the output shafts of the three bidirectional driving components to move the end executor to a target position to perform the work task.

The present invention has the beneficial effects specifically:
  1. Two-degree-of-freedom rotation of the big arm module and the small arm module connected in series is able to be independently realized by using three bidirectional driving components fixed on the base in the present invention, so that movement flexibility of an end executor in a working space is greatly improved.
  2. Because the three bidirectional driving components in the present invention are all located on the base, so that a weight of a moving part of the mechanical arm is reduced, a joint space utilization rate of the mechanical arm is improved, and wiring is simplified.
  3. The bidirectional driving component used in the present invention comprises a dual-purpose cylindrical gear which may mesh with two transmission gears perpendicular to each other; the dual-purpose cylindrical gear has the characteristics of a cylindrical gear and a gear rack at the same time, and may perform a stretching motion and a rotary motion respectively under drive of two transmission gears perpendicular to each other, thus improving structural compactness of the bidirectional driving component.

DETAILED DESCRIPTION OF PREFERRED EMBODIMENTS

In order to make the purpose, technical solution and advantages of the embodiment of the present invention more clear, the technical solution in the embodiment of the present invention will be clearly described below in conjunction with the accompanying drawings.

Figure 1:
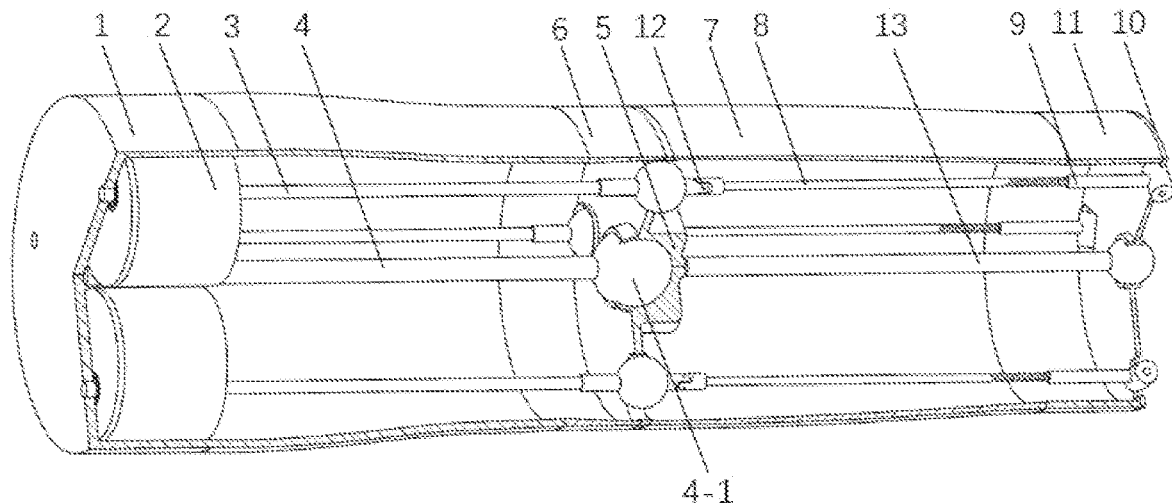
FIG. 1 is a schematic diagram of an overall structure of the present invention.
Figure 2:
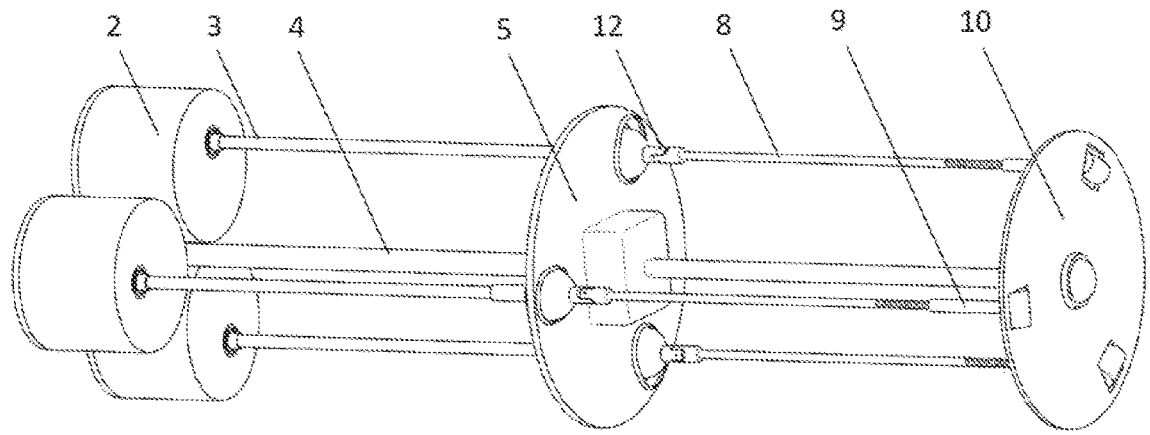
FIG. 2 is a schematic diagram of an inner structure of the present invention.

As shown in FIG. 1 and FIG. 2, A dual-joint multi-degree-of-freedom mechanical arm comprises a base, a driving mechanism, a big arm module and a small arm module; wherein the driving mechanism comprises three bidirectional driving components 2 mounted on the base 1 and arranged in a regular triangle. The bidirectional driving component 2 not only outputs a rotary motion but also outputs an axial stretching motion.

The big arm module comprises a big arm push rod 3, a big arm central rod 4, an elbow joint universal plate 5 and a big arm flexible housing 6. The elbow joint universal plate 5 is provided with a first central ball socket 5-1 and three waist-shaped ball sockets 5-2. The first central ball socket 5-1 is located at a central position of the elbow joint universal plate 5. The three waist-shaped ball sockets 5-2 are evenly distributed along a circumferential direction of the first central ball socket 5-1. A plane at which the three waist-shaped ball sockets 5-2 are located together is a characteristic plane; and a characteristic plane normal (i.e., a central axial line of the elbow joint universal plate 5 in the embodiment) passing through a center of the first central ball socket 5-1 is a characteristic central line. A longitudinal direction of the waist-shaped ball socket 5-2 is arranged along a radial direction of the characteristic central line. Across section (i. e., across section parallel to the characteristic plane) of the waist-shaped ball socket 5-2 is in a shape of a waist-shaped hole; and a profile of a longitudinal section (i.e., a cross section perpendicular to a longitudinal direction of the waist-shaped ball socket 5-2 of the waist-shaped ball socket 5-2 is two mutually opposite circular arcs.

Figure 3:
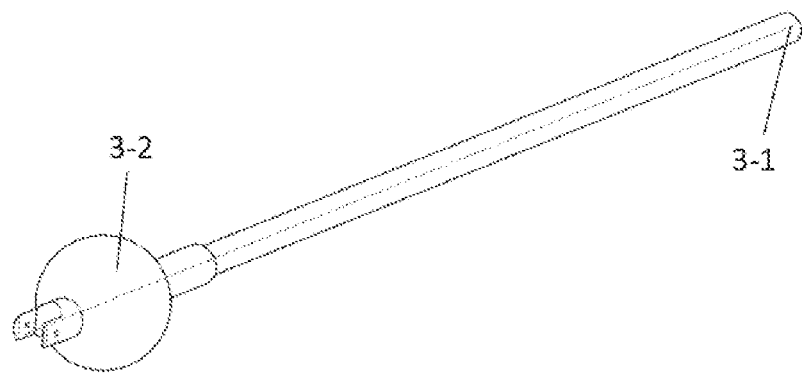
FIG. 3 is a three-dimensional schematic diagram of a big arm push rod of the present invention.
Figure 4:
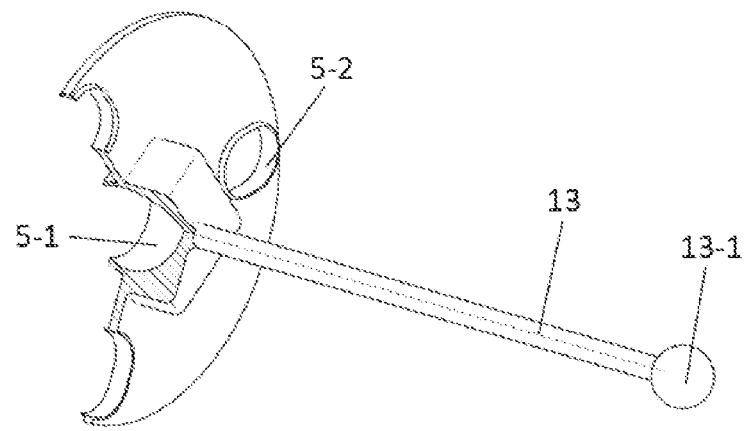
FIG. 4 is a schematic diagram of a combination of an elbow joint universal plate and a small arm central rod in the present invention.

As shown in FIG. 2, FIG. 3 and FIG. 4, an inner end of the big arm central rod 4 is fixed with the base 1. The inner end of the big arm central rod 4 is located at a central position of the regular triangle surrounded by the three bidirectional driving components 2. A first central sphere 4-1 is fixed at an outer end of the big arm central rod 4; and the first central sphere 4-1 and the first central ball socket 5-1 on the elbow joint universal plate 5 form a spherical pair. Inner ends of the three big arm push rods 3 are fixed with output shafts of the three bidirectional driving components 2; and connecting balls 3-2 are fixed at outer ends of the three big arm push rods 3. Three connecting balls 3-2 are respectively constrained in the three waist-shaped ball sockets 5-2. The connecting ball may not only slide in the corresponding waist-shaped ball socket 5-2 along the longitudinal direction of the waist-shaped ball socket 5-2, but also rotate in any direction in the corresponding waist-shaped ball socket 5-2. Through the stretching movement of the output shafts of the three bidirectional driving components 2, the elbow joint universal plate 5 may be driven to overturn in two-degree of freedom; and at the same time, the rotary motion of the output shafts of the three bidirectional driving components 2 will not affect the elbow joint universal plate 5.

The big arm flexible housing 6 is fixed at an outer side of the elbow joint universal plate 5. An edge of the big arm flexible housing 6 is connected with an edge of the base 1 through a cylindrical big arm protective sleeve. The big arm protective sleeve is in a rigid structure, which may hide and protect the big arm central rod and the three big arm push rods 3.

Figure 5:
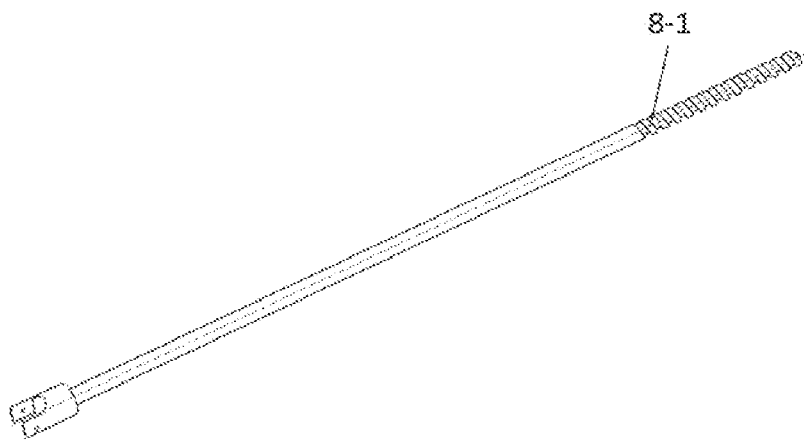
FIG. 5 is a structural schematic diagram of a first connecting rod in the present invention.
Figure 6:
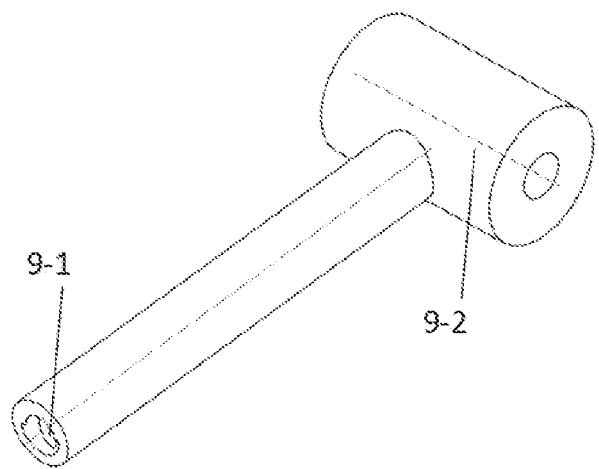
FIG. 6 is a structural schematic diagram of a second connecting rod in the present invention.
Figure 7:
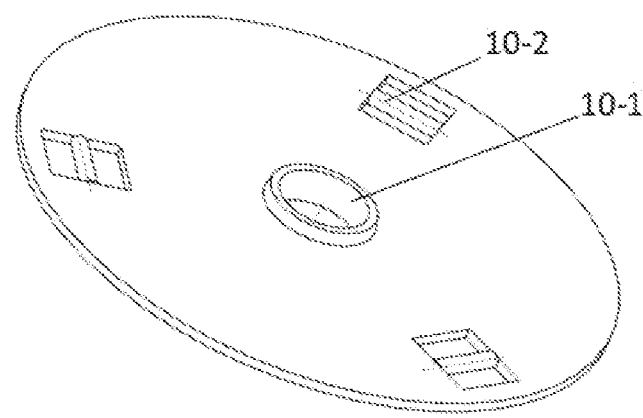
FIG. 7 is a structural schematic diagram of a wrist joint universal plate in the present invention.

As shown in FIG. 2, FIG. 4, FIG. 5. FIG. 6 and FIG. 7, the small arm module comprises a small arm protective sleeve 7, a wrist joint universal plate 10, a small arm flexible housing 11, a universal joint coupler 12, a small arm central rod 13, a small arm stretching rod and a wrist joint universal plate 10. The wrist joint universal plate 10 is provided with a second central ball socket 10-1 and is equipped with three articulated shafts 10-2. The second central ball socket 10-1 is located at a central position of the wrist joint universal plate 10. The three articulated shafts are evenly distributed along a circumferential direction of the second central ball socket 10-1; axial lines of the articulated shafts 10-2 are all arranged along a tangential direction of the second central ball socket 10-1. An inner end of the small arm central rod 13 is fixed with a central position of an outer side surface of the elbow joint universal plate 5; an outer end of the small arm central rod 13 is fixed with a second central ball 13-1. The second central ball 13-1 and a second central ball socket on the wrist joint universal plate 10 form a spherical pair;

The small arm stretching rod comprises a first connecting rod 8 and a second connecting rod 9. An outer end of the first connecting rod 8 is provided with an external thread 8-1; an inner end of the connecting rod 9 is provided with a threaded hole 9-1. The external thread 8-1 at the outer end of the first connecting rod 8 and the threaded hole 9-1 at the inner end of the second connecting rod 9 form a spiral pair. An inner end of the first connecting rod 8 in the three small arm stretching rods is in transmission connection with three connecting balls through the universal joint coupler 12 respectively. An articulated sleeve 9-2 at an outer end of the second connecting rod 9 in the three small arm stretching rods and three articulated shafts 10-2 on the wrist joint universal plate 10 respectively form rotating pairs.

The small arm flexible housing 11 is fixed at an outer side of the wrist joint universal plate 10. An edge of the small arm flexible housing 11 is connected with the edge of the big arm flexible housing 6 through a cylindrical small arm protective sleeve 7. The small arm protective arm 7 is in a rigid structure to hide and protect the small arm central rod 13 and the small arm stretching rod.

When the output shafts of the three bidirectional driving components 2 rotate, the first connecting rod 8 may be driven to rotate; at this time, because the three second connecting rods 9 are all rotatably connected to the wrist joint universal plate 10, the second connecting rod 9 may not rotate with the first connecting rod 8. Therefore, with the rotation of the first connecting rod 8, the small arm stretching rod is extended or shortened to drive the wrist joint universal plate 10 to overturn in two-degree of freedom.

Figure 8:
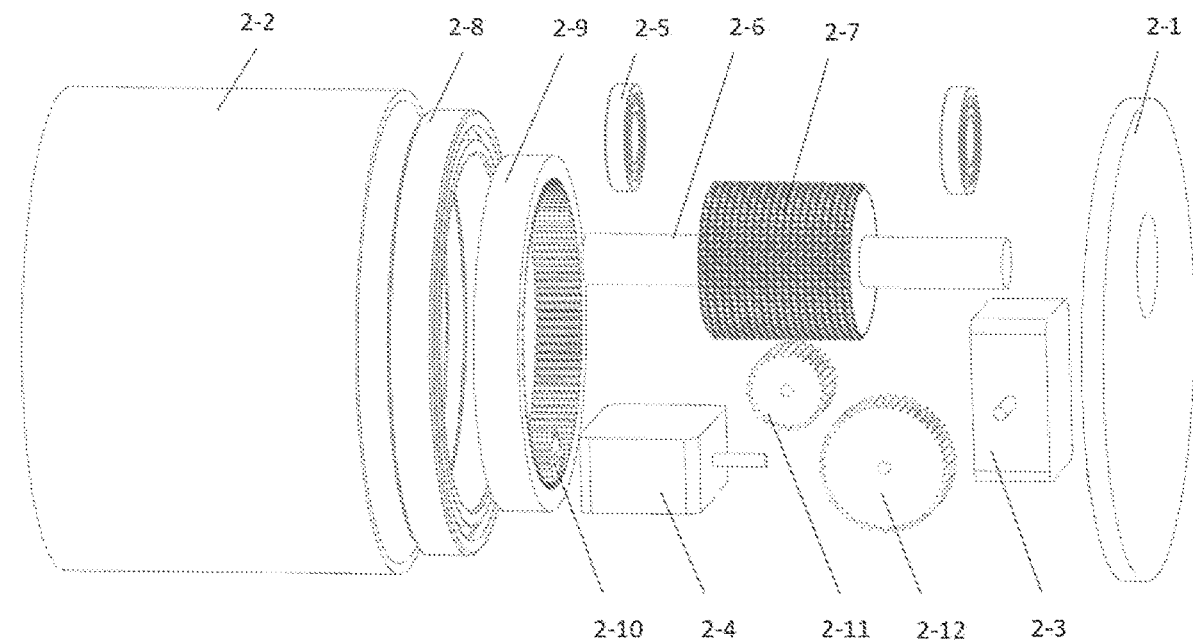
FIG. 8 is an explosion schematic diagram of a bidirectional driving component in the present invention.
Figure 9:
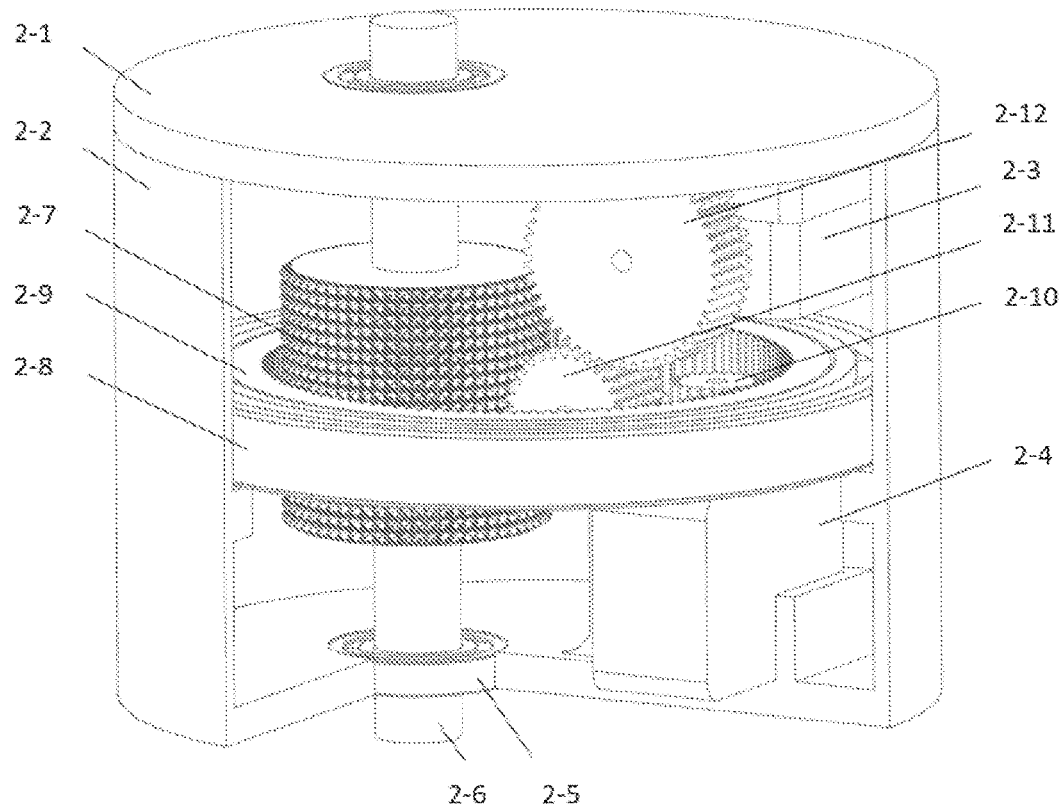
FIG. 9 is a schematic diagram of an inner structure of the bidirectional driving component in the present invention.

As shown in FIG. 8 and FIG. 9, the bidirectional driving component 2 comprises a cover body 2-1, a housing 2-2, a stretching driving steering engine 2-3, a rotary driving steering engine 2-4, a shaft sleeve 2-5, an output shaft 2-6, a dual-purpose cylindrical gear 2-7, a bearing 2-8, a circumferential driving gear 2-9, a circumferential driving gear 2-10, an axial driving gear 2-11 and an axial driving gear 2-12. The output shaft 2-6 is eccentrically arranged in the housing 2-2; both ends of the output shaft 2-6 are connected with the cover body 2-1 and the housing 2-2 through the shaft sleeves 2-5 respectively to form a cylindrical pair, so that the output shaft 2-6 may rotate and slide axially relative to the housing 2-2. A plurality of rolling balls are uniformly mounted on an inner side surface of the shaft sleeve 2-5 to reduce a resistance of the output shaft 2-6 to rotate and slide axially.

The cover body 2-1 is fixed at an opening atone end of the housing 2-2. The circumferential transmission gear 2-9 adopts an internal gear, and its outer circumferential surface is coaxially and rotatably connected in the housing 2-2 through the bearing 2-8. An axial line of the circumferential transmission gear 2-9 is parallel to an axial line of the output shaft 2-6. The axial transmission gear 2-11 is rotatably connected in the housing 2-2. An axial line of the axial transmission gear 2-11 is perpendicular to the axial line of the output shaft 2-6. Both the stretching driving steering engine 2-3 and the rotary driving steering engine 2-4 are fixed in the housing 2-2; the axial driving gear 2-12 is fixed on the output shaft 2-6 of the stretching driving steering engine 2-3; the circumferential driving gear 2-10 is fixed on the output shaft 2-6 of the rotary driving steering engine 2-4. The circumferential driving gear 2-10 is meshed with the circumferential transmission gear 2-9. The axial driving gear 2-12 is meshed with the axial transmission gear 2-11.

Figure 10:
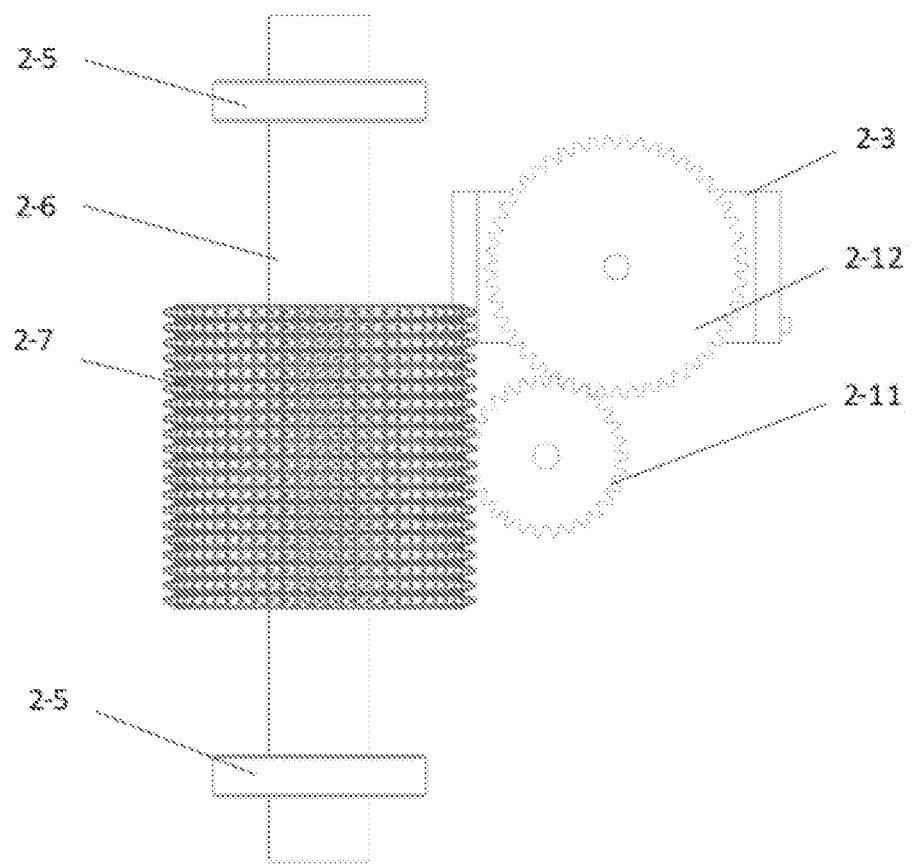
FIG. 10 is a transmission schematic diagram of a dual-purpose cylindrical gear, an axial transmission gear and an axial driving gear in the present invention.
Figure 11:
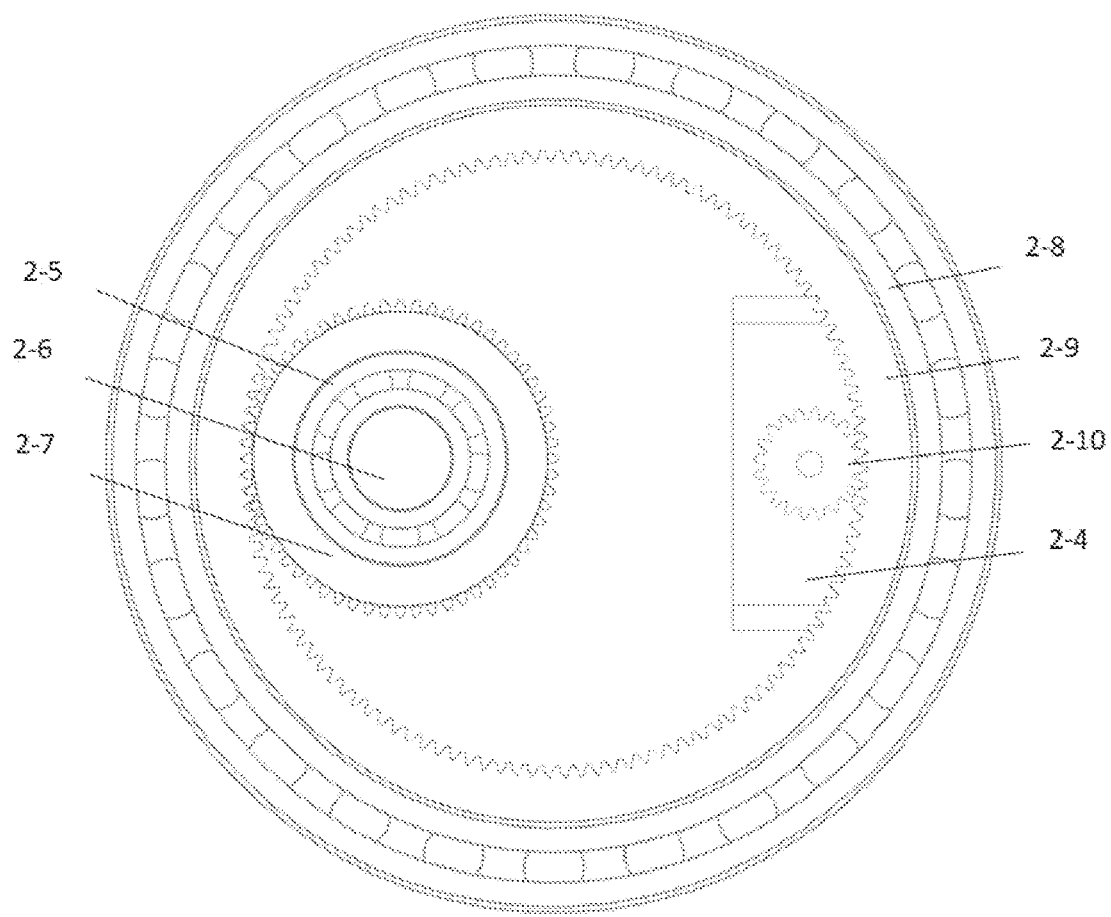
FIG. 11 is a transmission schematic diagram of the dual-purpose cylindrical gear, a circumferential transmission gear and a circumferential driving gear in the present invention.

As shown in FIG. 9, FIG. 10 and FIG. 11, the dual-purpose cylindrical gear 2-7 is coaxially fixed on the output shaft 2-6. A cross section of the dual-purpose cylindrical gear 2-7 is in a shape of the cylindrical gear, and a longitudinal section (i.e., a shaft section) is in a shape of the gear rack. To be specific, an outer circumferential surface of the dual-purpose cylindrical gear 2-7 is provided with a plurality of gear tooth arrays evenly distributed along a circumferential direction of an axial line of the cylindrical gear 2-7. Each gear tooth array comprises a plurality of dual-purpose gear teeth sequentially arranged at equal intervals along an axial direction of the dual-purpose cylindrical gear 2-7.

Figure 12:
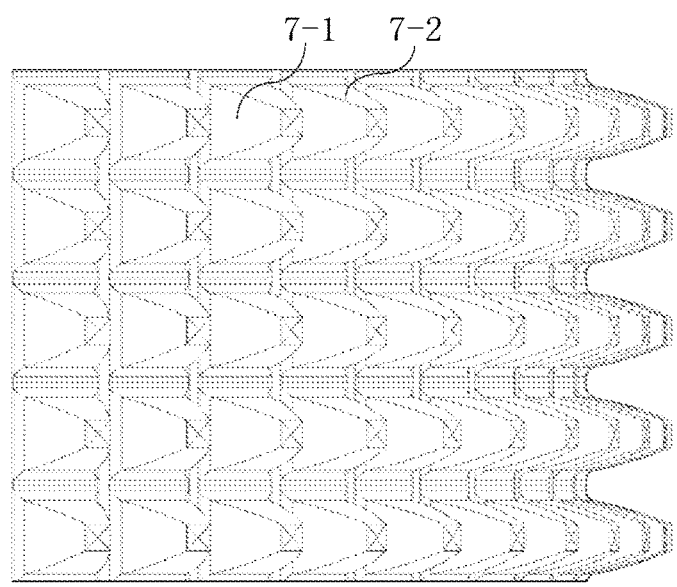
FIG. 12 is a partial schematic diagram of the dual-purpose cylindrical gear in the present invention.

As shown in FIG. 12, two side surfaces of each dual-purpose gear tooth in the tangential direction of the dual-purpose cylindrical gear 2-7 are circumferential meshing tooth surfaces 7-1; the circumferential meshing tooth surface 7-1 is specifically an involute tooth surface of a cylindrical spur gear, which can cooperate with the tooth surface on the circumferential transmission gear 2-9 to realize the meshing of the dual-purpose gear teeth with the circumferential transmission gear 2-9. The circumferential transmission gear 2-9 does not affect the axial sliding of the dual-purpose cylindrical gear 2-7.

Two side surfaces of each dual-purpose gear tooth along the axial direction of the dual-purpose cylindrical gear 2-7 are axial meshing tooth surfaces 7-2; the axial meshing tooth surface 7-2 is specifically an involute tooth surface of a straight gear rack, which may be matched with a tooth surface on the axial transmission gear 2-11 to realize meshing the dual-purpose gear teeth with the axial transmission gear 2-11. The axial transmission gear 2-11 does not affect circumferential rotation of the dual-purpose cylindrical gear 2-7.

The tooth top surface of the dual-purpose gear tooth is a partial cylindrical surface; and an axial line of the partial cylindrical surface coincides with the axial line of the output shaft.

Basic design parameters of the dual-purpose cylindrical gear: in order to ensure service life and strength requirements of the gear and ensure that the gear does not undercut, a number of teeth should not be less than 17 when designing, that is: $Z_1 \geq 17$. A minimum thickness (i.e., tooth width) of the circumferential transmission gear 2-9 is $B_1 \geq m_1'*4$ in order to ensure a coincidence degree of gear transmission and requirements of a matching teeth number; and the minimum thickness (i.e., tooth width) of the axial transmission gear 2-11 is $B_2 \geq m_1'*3$. $m_1'$ and $m_1$ are an axial module and a circumferential module of the dual-purpose cylindrical gear, that is, the axial module and the circumferential module may be different, and different module may be selected according to an actual situation, so that the tooth width of the circumferential transmission gear 2-9 and the tooth width of the axial transmission gear 2-11 are designed according to the actual situation.

Because the tooth width of the gear determines a size of an action area when the two gears mesh, the larger the action area is, the greater the friction is, the overlarge friction is not conducive to improvement of the transmission efficiency. Therefore, the minimum thickness (i.e., tooth width) of the circumferential transmission gear 2-9 is $B_1 \leq m_1'*6$; and the minimum thickness (i.e., tooth width) of axial transmission gear 2-11 is $B_2 \leq m_1'*5$.

To sum up, the minimum thickness (i.e., tooth width) of the circumferential transmission gears 2-9 is $m_1'*4 \leq B_1 \leq m_1'*6$; and the minimum thickness (i.e., tooth width) of the axial transmission gear 2-11 is $m_1*3 \leq B_2 \leq m_1*5$.

When the output shaft of the bidirectional driving component 2 needs to perform the stretching movement, the stretching steering engine 2-3 rotates to drive the axial driving gear 2-12 and the axial transmission gear 2-11 to rotate, and further driving the output shaft and the dual-purpose cylindrical gear 2-7 to slide along the axial direction.

When the output shaft of the bidirectional driving component 2 needs to rotate, the rotary steering engine 2-4 is rotated to drive the circumferential driving gear 2-10 and the circumferential driving gear 2-9 to rotate, and further driving the output shaft and the dual-purpose cylindrical gear 2-7 to rotate around the axial lines thereof.

Therefore, the bidirectional driving component 2 may realize independent control of the axial movement and the circumferential rotation of the output shaft, and the structure is more compact.

A machining process of the dual-purpose cylindrical gear 2-7 is as follows:

A cylindrical gear blank is machined into a dual-purpose cylindrical gear blank by using a plate-like milling cutter or a finger-like milling cutter; the dual-purpose cylindrical gear blank is machined via a hobbing cutter; in a machining process, the hobbing cutter rotates and feeds along a radial direction of the dual-purpose cylindrical gear blank, and at the same time, the dual-purpose cylindrical gear blank rotates around an axial line thereof to divide an upper tooth profile of the dual-purpose cylindrical gear blank into dual-purpose gear tooth arrays evenly distributed on an outer circumferential surface of the dual-purpose cylindrical gear.

The driving method of the dual-joint multi-degree-of-freedom mechanical arm is as follows:

step 1: according to a work task of the mechanical arm, mounting a corresponding end executor on an outer side surface of the wrist joint universal plate 10 (for example, mounting a mechanical arm gripper as the end executor when grasping, and mounting a welding gun as the end executor when welding); and step 2: driving the elbow joint universal plate to overturn through an axial motion of the output shafts of the three bidirectional driving components 2; driving the wrist joint universal plate 10 to overturn through a circumferential rotation of the output shafts of the three bidirectional driving components 2; and realizing flexible control of a position and a posture of the end executor to complete the work task.

We claim:

1. A dual joint multi-degree-of-freedom mechanical arm, comprising a base (1), a driving mechanism, a big arm module and a small arm module; wherein the driving mechanism comprises three bidirectional driving components (2) mounted on the base (1); each of the three bidirectional driving components (2) is capable of outputting a rotary motion and an axial stretching motion; the big arm module comprises three big arm push rods (3), a big arm central rod (4) and an elbow joint universal plate (5); and the elbow joint universal plate (5) is provided with a first central ball socket (5-1) and three ellipse-shaped ball sockets (5-2) surrounding the first central ball socket (5-1);

an inner end of the big arm central rod (4) is fixed with the base (1); a first central sphere (4-1) is fixed at an outer end of the big arm central rod (4); the first central sphere (4-1) and the first central ball socket (5-1) on the elbow joint universal plate (5) form a spherical joint; inner ends of the three big arm push rods (3) are respectively fixed with output shafts of the three bidirectional driving components (2); three connecting balls (3-2) are respectively fixed at outer ends of the three big arm push rods (3); and the three connecting balls (3-2) are respectively constrained in the three ellipse-shaped ball sockets (5-2);

the small arm module comprises a universal joint coupler (12), a small arm central rod (13), three small arm stretching rods and a wrist joint universal plate (10); the wrist joint universal plate (10) is provided with a second central ball socket (10-1); an inner end of the small arm central rod (13) is fixed with the elbow joint universal plate (5); an outer end of the small arm central rod (13) is fixed with a second central ball (13-1); and the second central ball (13-1) and the second central ball socket on the wrist joint universal plate (10) form a spherical joint; and each of the three small arm stretching rods comprises a first connecting rod (8) and a second connecting rod (9); an outer end of the first connecting rod (8) and an inner end of the second connecting rod (9) form a screw mechanism; an inner end of the first connecting rod (8) of each of the three small arm stretching rods is in transmission connection with a corresponding one of the three connecting balls through the universal joint coupler (12); and an outer end of the second connecting rod (9) of each of the three small arm stretching rods and a corresponding one of three different positions on the wrist joint universal plate (10) form a rotating joint.

2. The dual-joint multi-degree-of-freedom mechanical arm according to claim 1, wherein the three bidirectional driving components (2) are arranged in a regular triangle.

3. The dual-joint multi-degree-of-freedom mechanical arm according to claim 1, wherein the first central ball socket (5-1) is located at a central position of the elbow joint universal plate (5); and the three ellipse-shaped ball sockets (5-2) are evenly distributed along a circumferential direction of the first central ball socket (5-1).

4. The dual-joint multi-degree-of-freedom mechanical arm according to claim 1, wherein a plane at which the three ellipse-shaped ball sockets (5-2) are located together is a characteristic plane; a characteristic plane normal passing through a center of the first central ball socket (5-1) is a characteristic central line; and a longitudinal direction of each of the three ellipse-shaped ball sockets (5-2) is arranged along a radial direction of the characteristic central line.

5. The dual-joint multi-degree-of-freedom mechanical arm according to claim 1, wherein a cross section of each of the three ellipse-shaped ball sockets (5-2) is in a shape of a ellipse-shaped hole; and a profile of a longitudinal section of each of the three ellipse-shaped ball sockets (5-2) is two mutually opposite circular arcs.

6. The dual-joint multi-degree-of-freedom mechanical arm according to claim 1, wherein a big arm flexible housing (6) is fixed at an outer side of the elbow joint universal plate (5); an edge of the big arm flexible housing (6) is connected with an edge of the base (1) through a cylindrical big arm protective sleeve; a small arm flexible housing (11) is fixed at an outer side of the wrist joint universal plate (10); and an edge of the small arm flexible housing (11) is connected with the edge of the big arm flexible housing (6) through a cylindrical small arm protective sleeve (7).

7. The dual-joint multi-degree-of-freedom mechanical arm according to claim 1, wherein the wrist joint universal plate (10) is provided with three articulated shafts (10-2); the second central ball socket (10-1) is located at a central position of the wrist joint universal plate (10); the three articulated shafts are evenly distributed along a circumferential direction of the second central ball socket (10-1); axial lines of the articulated shafts (10-2) are all arranged along a tangential direction of the second central ball socket (10-1); the outer end of the second connecting rod (9) of each of the three small arm stretching rods is fixed with an articulated sleeve (9-2); and the articulated sleeve (9-2) on the second connecting rod (9) of each of the three small arm stretching rods is articulated with a corresponding one of the three articulated shafts (10-2) on the wrist joint universal plate (10).

8. The dual-joint multi-degree-of-freedom mechanical arm according to claim 1, wherein each of the three bidirectional driving components (2) comprises a housing (2-2), a stretching driving motor (2-3), a rotary driving motor (2-4), an output shaft (2-6), a dual-purpose cylindrical gear (2-7), a circumferential transmission gear (2-9), a circumferential driving gear (2-10), an axial transmission gear (2-11) and an axial driving gear (2-12); the output shaft (2-6) and the housing (2-2) form a cylindrical joint; the circumferential transmission gear (2-9) is rotatably connected in the housing (2-2); an axial line of the circumferential transmission gear (2-9) is parallel to an axial line of the output shaft (2-6); the axial transmission gear (2-11) is rotatably connected in the housing (2-2); and an axial line of the axial transmission gear (2-11) is perpendicular to an axial line of the output shaft (2-6);

both the stretching driving motor (2-3) and the rotary driving motor (2-4) are fixed in the housing (2-2); the axial driving gear (2-12) is fixed on the output shaft (2-6) of the stretching driving motor (2-3); the circumferential driving gear (2-10) is fixed on the output shaft (2-6) of the rotary driving motor (2-4); the circumferential driving gear (2-10) is meshed with the circumferential transmission gear (2-9); and the axial driving gear (2-12) is meshed with the axial transmission gear (2-11); and the dual-purpose cylindrical gear (2-7) is coaxially fixed on the output shaft (2-6); an outer circumferential surface of the dual-purpose cylindrical gear (2-7) is provided with a plurality of gear tooth arrays evenly distributed along a circumferential direction of an axial line of the cylindrical gear (2-7); each gear tooth array comprises a plurality of dual-purpose gear teeth sequentially arranged at equal intervals along an axial direction of the dual-purpose cylindrical gear (2-7); two side surfaces of each dual-purpose gear tooth in a tangential direction of the dual-purpose cylindrical gear (2-7) are circumferential meshing tooth surfaces (7-1) being able to be matched with the circumferential transmission gear (2-9) for transmission; two side surfaces of each dual-purpose gear tooth along the axial direction of the dual-purpose cylindrical gear (2-7) are axial meshing tooth surfaces (7-2) being able to matched with the axial transmission gear (2-11) for transmission; in a working process, the circumferential transmission gear rotates to drive the dual-purpose cylindrical gear to rotate; and the axial transmission gear rotates to drive the dual-purpose cylindrical gear to move in an axial direction.

9. The dual-joint multi-degree-of-freedom mechanical arm according to claim 8, wherein a value range of a tooth width $B_1$ of the circumferential transmission gear is $m_1'*4 \leq B_1 \leq m_1'*6$; a value range of a tooth width $B_2$ of the axial transmission gear is $m_1*3 \leq B_2 \leq m_1*5$; and $m_1'$ and $m_1$ are an axial module and a circumferential module of the dual-purpose cylindrical gear.

10. A driving method of the dual-joint multi-degree-of-freedom mechanical arm according to claim 1, comprising the following steps of:

step 1: according to a work task of the mechanical arm, mounting a corresponding end effector on an outer side surface of the wrist joint universal plate (10); and step 2: driving the elbow joint universal plate to overturn through an axial motion of the output shafts of the three bidirectional driving components (2); and driving the wrist joint universal plate (10) to overturn through a circumferential rotation of the output shafts of the three bidirectional driving components (2) to move the end effector to a target position to perform the work task.

\* \* \* \* \*